March 27, 1956 R. L. COOPER 2,740,060
DIFFERENTIAL ELECTRICAL MOTOR
Filed Feb. 26, 1954 4 Sheets-Sheet 1

INVENTOR.
Roy L. Cooper

March 27, 1956 R. L. COOPER 2,740,060
DIFFERENTIAL ELECTRICAL MOTOR
Filed Feb. 26, 1954 4 Sheets-Sheet 2

INVENTOR.
Roy L. Cooper

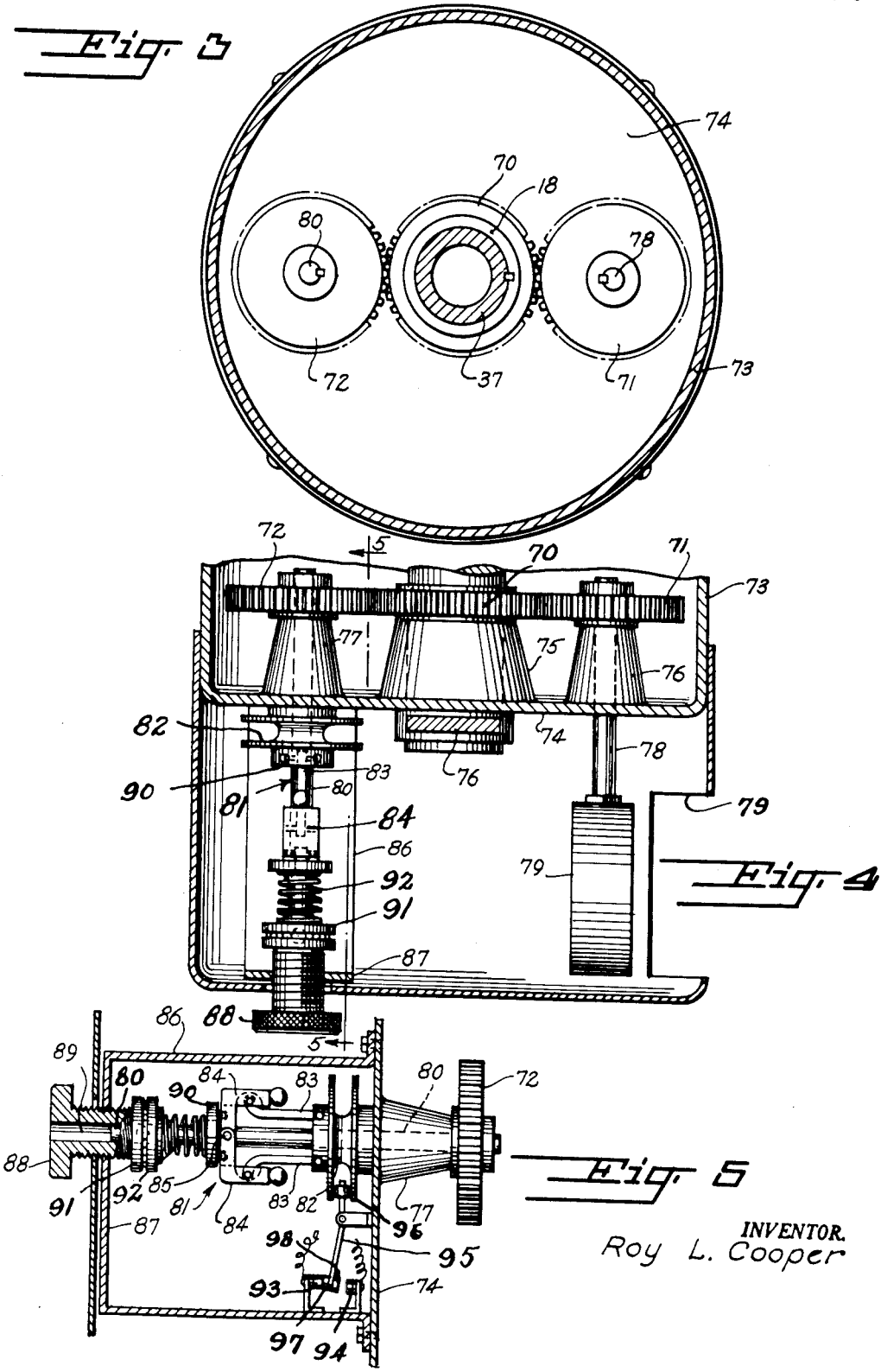

March 27, 1956  R. L. COOPER  2,740,060
DIFFERENTIAL ELECTRICAL MOTOR
Filed Feb. 26, 1954 4 Sheets-Sheet 4

INVENTOR.
Roy L. Cooper

United States Patent Office 2,740,060
Patented Mar. 27, 1956

2,740,060

DIFFERENTIAL ELECTRICAL MOTOR

Roy L. Cooper, Waterman, Ill., assignor, by direct and mesne assignments, to Waterman Engineering Company, Waterman, Ill., a corporation of Illinois Application February 26, 1954, Serial No. 412,724

14 Claims. (Cl. 310—122)

This invention relates to an electric motor of the differential type. By this is meant a motor of the type where the output shaft carrying the armature is free to revolve and the case carrying the field is also free to revolve. This type of motor effects a turning of the output shaft by means of braking action on the revolving case. This is not a new idea. However, the structure involved as herein disclosed, includes certain new features and additions which combine to accomplish both speed and load control over a wide range of speed output, and including a feasible and novel integration of the component parts.

It is the cardinal object of this invention to provide an electric motor of the differential type wherein a rotating annular housing is provided, upon the inner periphery of which there is mounted a pair of longitudinally spaced squirrel cages, one of which functions as the field for the armature of the principal motor, while the other squirrel cage provides a field for an armature of a braking mechanism, the latter being controlled by a governor mechanism which will operate according to speed and load requirements, and further including adjustable means for determining the relative speeds of the rotating elements.

It is also an object of the invention to provide automatic means for returning the control means of the electromagnetic braking current to its starting position when electric current to the motor is interrupted.

Additional objects, advantages and features of the invention will be apparent from the following description when considered in conjunction with the accompanying drawings.

Figure 3 is a cross section on the line 3—3 of Fig. 1.

Figure 4 is a cross section on the line 4—4 of Fig. 2.

Figure 5 is a cross section on the line 5—5 of Fig. 4.

Figure 6 is a cross section on the line 6—6 of Fig. 1, and

Figure 1:
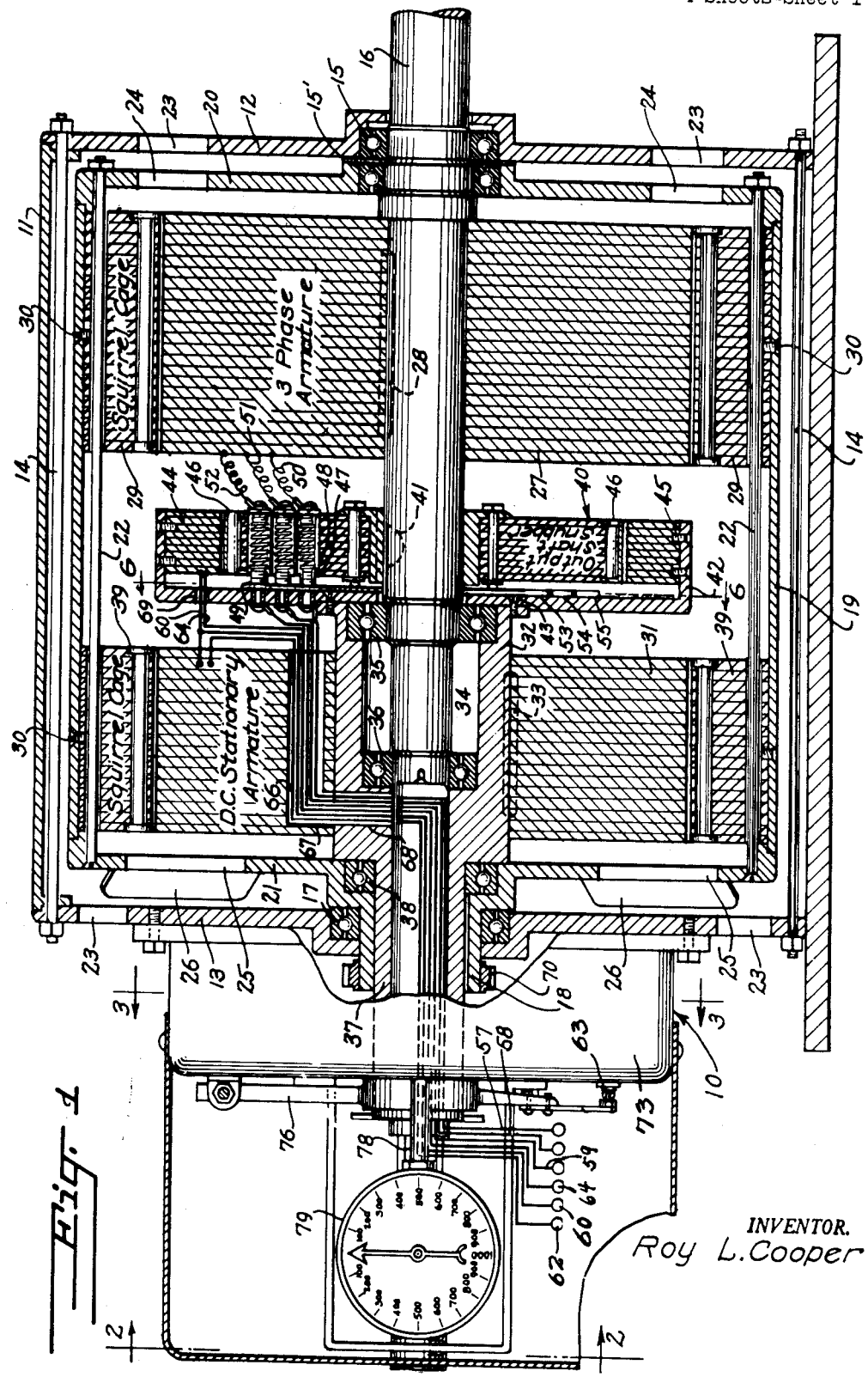
Figure 1 is a longitudinal sectional view through the motor, a portion of the housing being shown in elevation.

Reference is first made to Figure 1 of the drawings, wherein the motor generally is indicated by the reference character 10, is shown as comprising an annular casing 11 having end walls 12 and 13 secured in assembled relation by means of rods 14, the end wall 12 being provided with a bearing 15 for rotatably supporting an output shaft 16, while the end wall 13 is provided with a bearing 17 for rotatable support of a hub 18 of a housing 19 as will now be described.

The housing 19 is of cylindrical form closed at the rear by an end plate 20 and at the front by an end plate 21. The end plates are secured in assembled relation upon the housing 19 by a suitable number of tie rods 22. In order to provide ventilation of the motor, the end walls 12 and 13 are formed with openings 23, and the rear wall 20 is formed with openings 24. The front wall 21 is also formed with openings 25 and further is provided with fan blades 26 for creating a circulation of air through the motor upon rotation of the housing 19, as will be understood.

Upon the shaft 16 inwardly of the plate 20, a 3 phase laminated armature 27 is keyed as at 28. Shaft 16 is supported in a bearing 15' concentric with the bearing 15. The armature is electrically associated with a squirrel cage 29 positioned within the periphery of the housing 19 and secured thereto by means of a number of countersunk screws 30. Inwardly of the plate 21 a stationary armature 31 is keyed to a hub 32 as at 33, the hub having an axial annular enlargement 34 in which there is mounted a pair of bearings 35 and 36 for rotatably supporting the inner end of the shaft 16. The hub 32 has an axial hollow annular shaft 37 which is journalled in a bearing 38 mounted in the wall 21 of the housing 19. A squirrel cage 39 is mounted within the periphery of the housing 19 in the same manner as the squirrel cage 29 and is in electrical association with the armature 31.

Between the armature 27 and the armature 31, an output shaft snubber 40 is keyed to the drive shaft 16 as indicated at 41. The snubber 40 is housed in an annular open ended casing 42 mounted upon the inner face of the hub 32 as at 43, the open end of the casing being presented toward the armature 27. Upon the inner periphery of the casing 42 a stationary armature or electromagnetic brake winding 44 is secured by screws 45 which attach the laminated structure to the casing 42. The snubber 40 is in the form of a squirrel cage rotor 46 rotatable within the static armature 44, the latter being held stationary by virtue of its connection with hub 32 of the armature 31.

From the construction thus far described it will be seen that the housing 19, and the squirrel cages 29 and 39 are rotatable as an integral unit, while snub brake squirrel cage 46 and armature 27 upon shaft 16 are rotatable as an integral unit, and armatures 31 and 44 remain substantially stationary.

Figure 7:
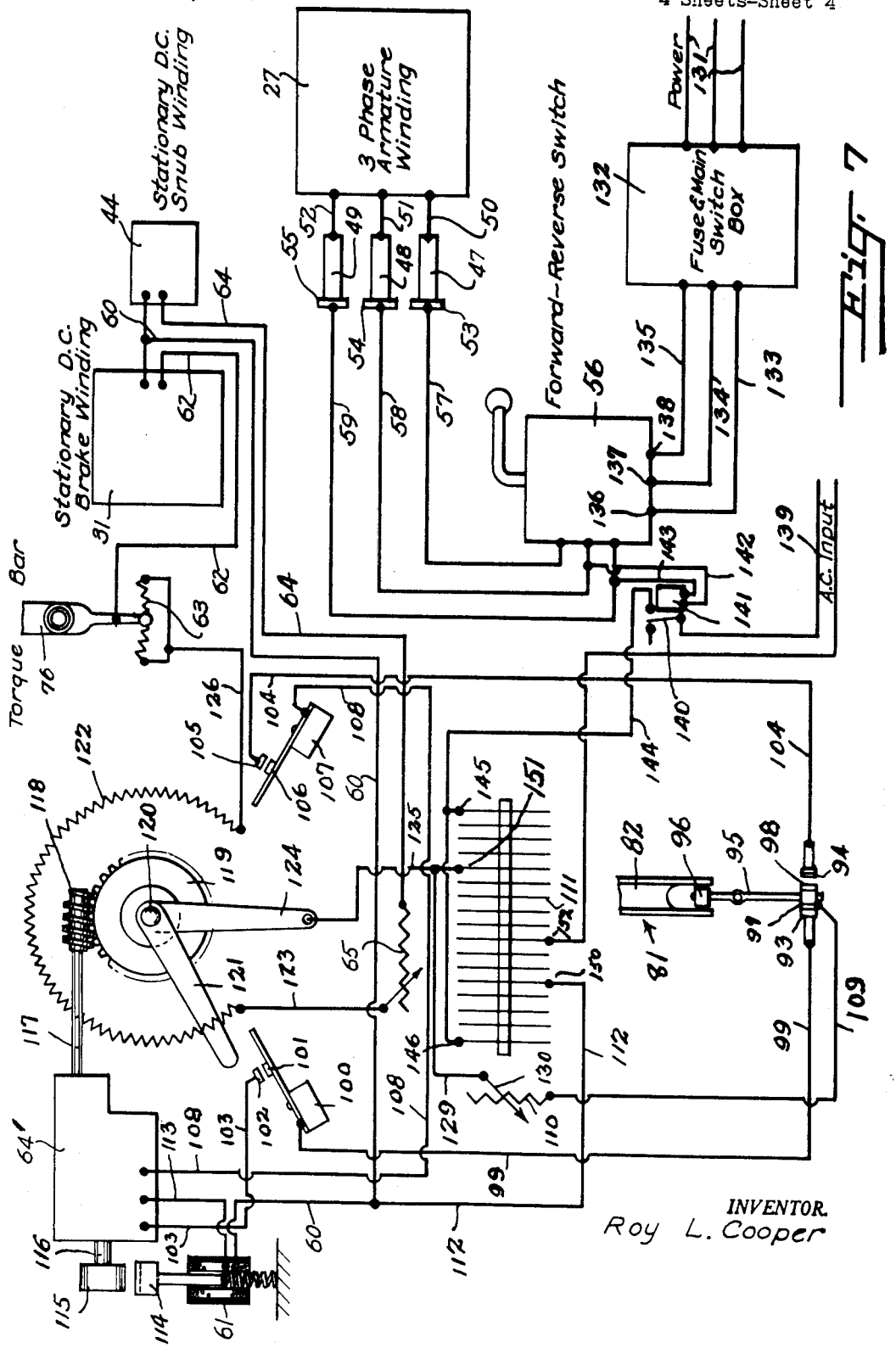
Figure 7 is a wiring diagram of the motor system embodying the invention.

The squirrel cage rotor 46 is provided with three spring urged brushes 47, 48, and 49, each of which are connected to the 3 phase armature 27 by leads 50, 51 and 52. The brushes 47, 48 and 49 are in electrical contact with respective concentric rings 53, 54 and 55 which in turn are connected to a forward and reverse switch 56 (see Figure 7) by electrical leads 57, 58 and 59. The armature 31 and the static armature 44 are electrically connected by a common lead 60 through lead 112 to rectifier output connection at 150. The brake winding 31 has a lead 62 in circuit with rheostat 63, while the snub brake winding 44 has a lead 64 in electrical circuit with an adjustable rheostat 65. In order that the various electrical leads may be brought out from the housing 19 to the exterior thereof, the armature 31 is formed with a transverse opening 66 and a vertical extension 67 which is in registry with an opening 68 formed in the hub 32, the leads passing through the hollow shaft 37 to the exterior thereof as shown in Figure 1. The casing 42 is provided with an opening 69 to accommodate the leads 60, 62 and 64.

D. C. motor 64' which operates to rotate wiper arm 121 upon rheostat resistance 122, is a small gear reducer type motor. This motor contains two sets of windings, one for forward motion and one for reverse motion. It is geared so that the wiper arm 121 will rotate the full circumference of the rheostat in approximately two seconds. Circuit breakers 100 and 107 are inserted in the lines which carry the current to the motor 64' so that when wiper arm has reached the maximum point of rotation in either direction the circuit will be broken and movement of the wiper arm is then stopped.

In this adaptation I have shown the D. C. source as a selenium plate rectifier. The A. C. input comes to the rectifier on one side to bridge 145—146, and to the central connection 152. The output connections of the rectifier are 150 and 151.

The complete circuit for the stationary brake winding 31 includes lead 60 to lead 112 to rectifier connection 150. Then rectifier connection 151 through lead 125 to rheostat tab 124 through wiper arm 121 and through any clockwise portion of resistance of 122 to lead 126 through resistor 63, torque arm wiper and lead 62 to winding 31.

The complete circuit for the stationary snub winding 44 passes through the common lead 60 to lead 112 to rectifier at 150 from rectifier at 151 to lead 125, rheostat tab 124 through wiper arm 121 to any counterclockwise portion of resistor 122 to lead 123 to manually adjustable resistor 65 through line 64 to winding 44.

The complete circuit for operation of the rheostat in a counterclockwise direction starting from rectifier connection 151 through lead 129 to manually adjustable rheostat arm 130 to resistance 110 through lead 109 to governor controlled contact 97 and contact 93 through lead 99 to circuit breaker 100, contacts thereon 101 and 102 and lead 103 to motor 64'. Thence through lead 113 to solenoid winding 61 to lead 112 and to rectifier connection 150.

The complete circuit for operation of the rheostat in a clockwise direction starting from rectifier connection 151 through lead 129 to adjustable rheostat 130—110 through lead 109 to contact 98 and 94 through lead 104 to circuit breaker 107, and its contacts 106—105 to lead 108 and to motor 64'. Thence through common lead 113, solenoid 61 and lead 112 to rectifier connection 150.

The hub 18 extends outwardly beyond the wall 13 and has a gear 70 keyed thereon in mesh with similar gears 71 and 72 as clearly shown in Figures 3 and 4. These gears are inclosed in a housing 73 detachably mounted upon the end plate 13 of the casing 11. Upon the interior face of the wall 74 of the housing 73, an axial bearing 75 is formed having a diameter to receive and support the hollow shaft 37 which is of a length to project outwardly beyond the wall 74 for fixedly securing a torque bar 76, the function of which will be explained hereinafter. Laterally spaced upon opposite sides of the bearing 75, bearings 76' and 77 are formed, the bearing 76' rotatably supporting a shaft 78 upon which the gear 71 is suitably keyed. The outer end of the shaft 78 is operatively connected to a tachometer 79 (see Figures 1 and 4). The bearing 77 rotatably supports a shaft 80 extending outwardly of the housing for mounting of a governor 81 as will now be described, attention being particularly drawn to Figure 5 of the drawings.

The governor 81 includes a grooved collar 82 which is longitudinally slidable upon the shaft 80 having arms 83 pivotally connected thereto, the other ends of these arms being pivotally connected to respective weighted arms 84, which in turn are pivotally connected to the shaft 80 as at 85. A U-shaped bracket 86 is employed for supporting an adjusting means for controlling the swinging movement of the weighted arms 84 and as here shown the bight portion 87 of the bracket is formed with a tapped opening for threadedly receiving an adjusting head 88. The head 88 is provided with a bore 89 in axial alignment with the end of the shaft 80 and receives said end revolubly therein. In order to reduce friction and permit accurate adjustment of the movement of the arms 84, a roller supported collar 90 on the shaft 80 abuts the arms 84, while a ball race 91 on the shaft 80 abuts the inner end of the adjusting head 88; there being a helical spring 92 on the shaft 80 interposed between the collar 90 and the ball race 91.

The tachometer 79 and governor 81 are preferably housed in a casing which is provided with an opening 79 whereby the face of the tachometer may be viewed.

The governor 81 is employed to control the circuits to the motor 64', and to this end a pair of contacts 93 and 94 are suitably mounted on the bracket 86, and mounted upon the wall 74 there is an arm 95 the upper end 96 of which is disposed in the groove of the collar 82. The lower end of the arm 95 is provided with a pair of opposed and connected contacts 97 and 98 adapted to engage contacts 93 and 94 respectively under operation of the governor. Contact 93 includes a line 99 in circuit with one side of a circuit breaker switch 100 which has a contact 101 operable in connection with a contact 102 which is electrically connected to the motor 64' by a lead 103. Contact 94 includes a lead 104 in circuit with a contact 105 which is co-operable with a contact 106 of the circuit breaker switch 107 from which a lead 108 forms connection with the motor 64'. The circuit from the arm 95 of the governor 81 is completed by a lead 109 in electrical circuit with a manually adjustable resistor 110.

The motor 64' is a small gear reducer type motor, the driven shaft 117 of which is provided with a worm gear 118 in mesh with a gear 119 (see Figure 7) fixed on a shaft 120 and also fixed on shaft 120 there is a wiper contact arm 121 adapted to engage a concentric resistance element 122. It will be understood that the arm 121 actuates the current breaker switches 107 and 100 in its clockwise and counterclockwise rotation. One end of the resistance 122 is connected to the adjustable rheostat 65 by a lead 123 while a fixed arm 124 is electrically connected to the rectifier 111 by a lead 125, the opposite end of the resistance 122 being connected to the resistor 63 through a lead 126 which is controlled through movement of the torque bar 76, across said resistor.

Figure 2:
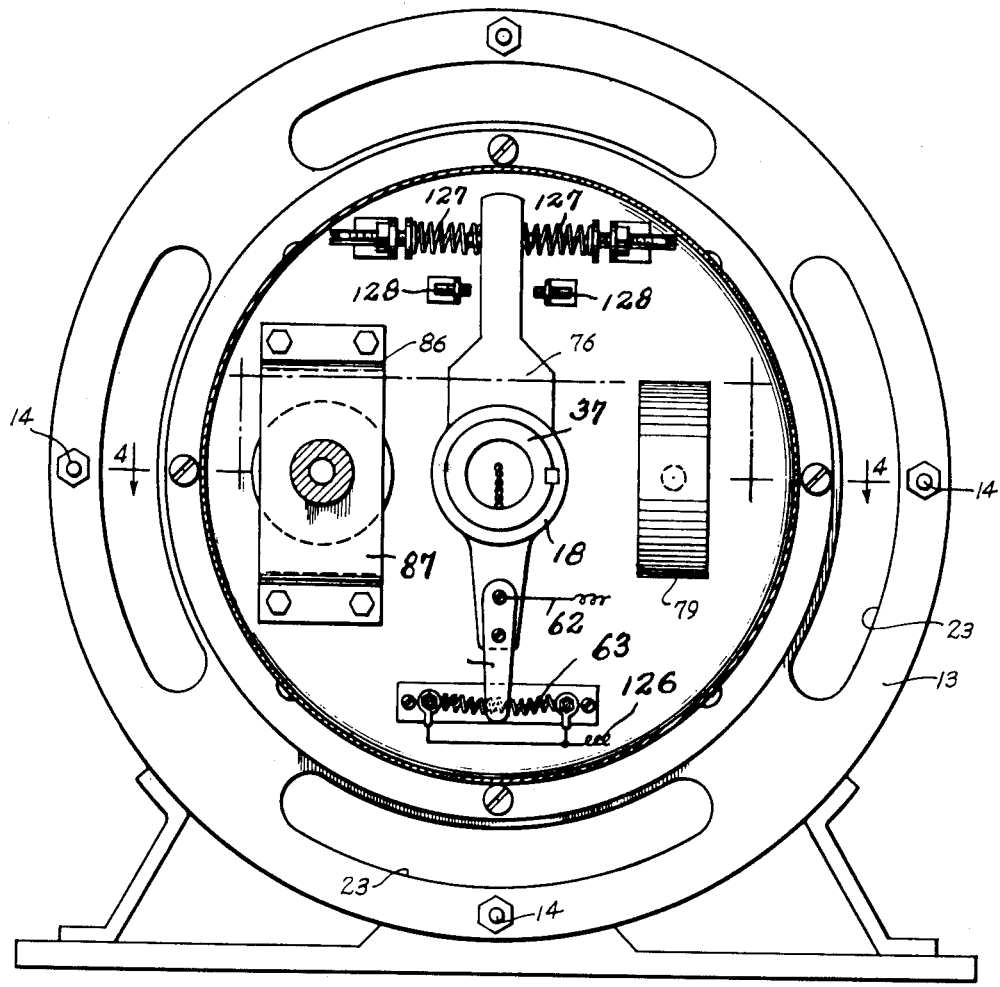
Figure 2 is a cross section on the line 2—2 of Fig. 1.
Figure 8:
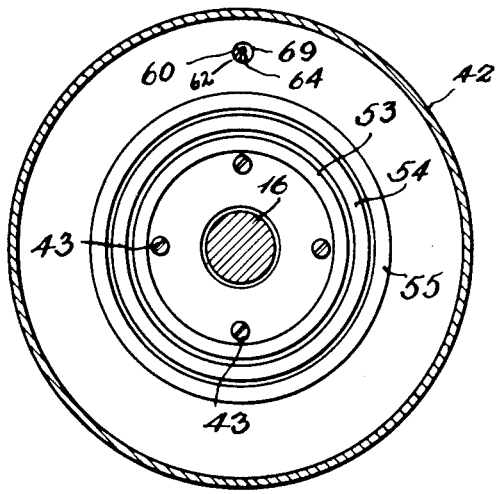

The torque bar 76 is tensioned by opposed adjustable springs 127 and suitable stops 128 limits the movement of the torque arm (see Figure 2).

The lead 125 from the fixed arm 124 of the resistor 122 includes a lead 129 electrically connected to a manually adjustable arm 130 of the resistor 110.

The main power line is indicated at 131 and includes a fuse and main switch box 132 from which feeder lines 133, 134 and 135 are electrically connected to contacts 136, 137 and 138 of forward reverse switch 56.

An A. C. input line is indicated at 139, one side of which is connected to a swinging arm 140 of a relay 141. One side 142 of the relay is connected to the line 58 of the three phase armature winding 27, while the other side 143 is connected to line 59 of the 3 phase armature winding 27. It will be noted that upon energization of the relay 141, the arm 140 will be actuated to establish a circuit through the line 144 which is electrically connected to the rectifier at 145—146.

As has been stated, electric power for operating the motor comes in through the fuse and main switch box 132, through the reversing switch 56, thence through the rings 53, 54, and 55 and brushes 47, 48, and 49 to the armature winding 27. Assuming that the control circuit is operated by A. C. current it will be noted that the A. C. relay 141 will close when the main power line switch 132 is closed. This then supplies current to the rectifier 111 as shown, or to other means of producing direct current. The D. C. current is controlled quantitatively to two places, namely the snub brake winding 44 and the main brake winding 31. The main brake winding 31 is employed to provide electromagnetic braking of the revolving case element 19. The snub brake winding 44 is used to provide a small amount of electromagnetic braking to the output shaft 16. This is actually an artificial load on the output shaft 16, for the purpose of preventing an increase in speed of the output shaft during zero load or comparatively light loads. In this connection it should be noted that since the revolving case 19 carries the air circulating fan blades 26, there is a considerable load imposed upon the case 19 which tends to slow down the revolution of case 19 with a consequent increase in speed of the output shaft 16. It is for this reason that this unit is designed to impose the greatest snubber load upon the shaft 16 at the time when said shaft has a light external load imposed thereon. It will be noted that there is a manually adjustable resistor 65 in the snub brake circuit. To adjust resistor 65, operate the motor with no load on the output shaft, adjust resistance so that output shaft 16 is barely brought to a stop.

The resistor 63 operates from torque bar movement, so that when there is a load increase on the output shaft 16, the resulting counterresistance movement of the torque bar will remove resistance from the electric circuit to the main brake windings 31, resulting in the imposition of more brake effect upon the revolving case 19. Since this result is obtained instantly as the load fluctuates, the result is obtained in maintaining a very constant speed control of the output shaft 16 regardless of ordinary load fluctuations.

The governor is set primarily for any given speed by means of spring pressure adjusted in tension by the adjusting head 88. This governor operates the two way switch 93—94 so that when the governor is revolving at a speed lower than it is adjusted for, one contact of the said switch is maintained which completes the circuit to the rheostat motor 64' which causes a revolution of the rheostat wiper arm in a counterclockwise direction, as shown, and which increases the resistance to the main brake winding 31 and decreases the resistance to the snub brake winding 44. Conversely, when the governor attains a speed equal to the tension for which it is adjusted, the other contact is made and the rheostat motor is reversed thereby revolving the rheostat wiper arm 121 in a clockwise direction as shown, thus decreasing the resistance in the circuit to the main brake winding 31 with a resultant increase in braking effect upon case 19, and at the same time increasing the resistance to the circuit to the snub brake winding 44 with resultant decrease in brake effect upon output shaft 16. By the above means, the governor effects an adjustment of the rheostat to the approximate range desired for adjusted speed and load, and thereafter resistance changes required to adjust for ordinary load fluctuations are assumed by the torque bar 76 and the controlled resistance 63.

The main line 112 to rheostat motor 64' passes through the solenoid 61 which operates to remove the spring loaded brake 114 while motor is operating. When current is broken, this brake stops the motor thus preventing over-run of rheostat as the motor coasts to a stop.

Although I do not want to be limited to the exact structure set forth herein, I wish to particularly emphasize certain factors involved in the construction disclosed in regard to the practicability and feasibility of the combination of elements herein disclosed. It will be noted that the rotating housing 19 carries the two squirrel cages 29 and 31. There are two particular reasons for using these squirrel cages as fields instead as armatures as is ordinarily done. First; because of the solid structure of a squirrel cage as contrasted to the construction of wound coils. If wound coils were used in the fields, the excessive centrifugal force exerted upon these coils would perhaps cause distortion of the coils due to their inherent flexibility thus creating a condition of unbalance dynamically of the rotating case and fields. Second; the use of wound coils in the fields would necessitate the use of more brushes thus further increasing the complexity of structure and the resultant cost of construction and maintenance.

It will be further noted that I have indicated the use of 3 phase current for operation of the principal motor. The reasons for this are as follows: Three phase electric motors require no starting coils in a motor which starts with very light load. 3 phase motors may be operated in either direction. In this connection it will be noted that this invention has automatic means of returning resistance equipment to starting position at any time the main motor current is interrupted. By means of A. C. relay 141, connected across two of the 3 phase lines, A. C. is automatically switched to feed the rectifier or other source of D. C. When the current to the main motor is interrupted, the back E. M. F. of the motor, while coasting to a stop, will continue to hold the relay 141 in contact so that the motor 64' will return rheostat wiper arm 121 in a counter-clockwise direction as shown, to maximum movement in this direction, thus removing all electromagnetic brake load from the case 19. In this condition, when starting, even though the output shaft has a heavy load imposed thereon, the case 19 is free to revolve, and motor may start with minimum of start torque characteristics. For this reason it is feasible to construct this motor with highest torque characteristics at full running speed, rather than sacrifice design to obtain high torque at starting with resultant sacrifice in torque at full operating speed. In reality, this motor always operates at full speed internally, regardless of the output speed. Therefore this motor cannot be damaged by overloading, since in this design, the maximum braking load that can be imposed upon the revolving case 19 is not an overload, and case will continue to revolve. Regardless of the apparent inherent beneficial characteristics of 3 phase current, I do not want to confine the scope of this invention solely to the use of 3 phase. Since in many territories, three phase may not be available, it may be found necessary to use single phase construction of the principal motor.

It should be pointed out that the principal object of this invention is invested in performance. By performance, it is meant, the ability to maintain desired output speed regardless of load imposed or fluctuation of such load.

I have shown in my diagrams one means of supplying direct current in the dual braking mechanism. However it should be noted that any D. C. source may be utilized, such as tube rectifier, exciter, motor generator or a D. C. source which is already available in the place of installation. Such a change would make the material difference in the construction as set forth.

I wish to emphasize the integration of the elements involved. The output shaft with the main motor armature and the snub brake element integrally mounted thereon; the revolving case which carries the two fields, the field of the main motor and the field of the principal braking mechanism; the essentially stationary hub element upon which is mounted the armature of the principal braking element and the stationary winding of the snub brake element. Only by this method of assembly can these various elements be inclosed into a single unit, and at the same time include a minimum of construction cost in brushes and other essential electrical connections.

It should be noted that the specifications herein include an electromagnetic snub brake upon the output shaft for the purpose of supplying an artificial load when output shaft is operating at very light load or no load; however, there are adaptations where this motor may be permanently attached to a load which is sufficient to eliminate the necessity of said snub brake. In this event it will not require the use of the snub brake on the output shaft, and said snub brake may be deleted in such adaptation together with such additional equipment shown essential to its operation.

It is believed that broadly, the integration of the component parts as herein disclosed constitute in design a motor unit which is novel in construction.

I claim:

1. In an electric motor having an armature and a field member rotatable in opposite directions, said armature and field member each having electromagnetic braking means, an output shaft on which said armature is mounted, and automatic means for controlling said electromagnetic braking means in response to torque fluctuations to maintain a substantially constant speed of said output shaft.

2. In an electric motor having an armature and a field member rotatable in opposite directions, said armature and field member each having electromagnetic braking means, a rotatable output shaft upon which is mounted the motor armature, an electromagnetic brake rotor for said armature braking means mounted on said output shaft, and means for automatic control of said electromagnetic braking means in response to the torque of said output shaft to maintain said shaft speed substantially constant.

3. The combination of claim 1 in which said automatic control means is adjustable for determining the speed of the output shaft.

4. The combination of claim 3, and automatic means for returning said control means to starting position upon interruption of electrical current to said motor.

5. The combination of claim 4, and indicator means operated by rotation of the field to show the output speed of said motor.

6. The combination defined in claim 2, and a rotatable case in which the motor field member is mounted about said armature, the field element of the electromagnetic braking means for said motor field member being mounted in said case spaced axially from said motor field member, and a substantially stationary hub upon which is mounted the armature element internally of said field element for said motor field member braking means.

7. The combination defined in claim 6, the field winding of said motor armature braking means being mounted on said hub spaced from said armature element of the motor field member braking means toward said motor armature, and the armature element of the motor armature braking means being mounted on said output shaft internally of said field winding.

8. The combination defined in claim 7, and adjustable means for determining the speed of said output shaft.

9. The combination of claim 7, and automatic means for returning said control means to starting position upon interruption of electric current to said motor.

10. In an electric motor having an armature and a field member rotatable in opposite directions, said armature and field member each having electro-magnetic braking means, an output shaft on which said motor armature is mounted, a motorized rheostat for controlling said electromagnetic braking means, a speed governor connected for rotation with said motor field member for regulating said rheostat to divide its resistance into proper proportions for increasing the braking effect of one braking means while decreasing that of the other so as to maintain the speed of said output shaft substantially constant during variations in torque on said output shaft.

11. The combination defined in claim 10, a source of direct current for said braking means and rheostat motor, a relay for energizing said braking means in response to the supply of power current to said motor, said relay being operative, even after the power current is cut off, by the back E. M. F. of the motor to permit the rheostat motor to restore the rheostat control to its starting position.

12. In an electric motor having an armature and a field member rotatable in opposite directions, said field member having electromagnetic braking means, and automatic means for controlling said electromagnetic braking means in response to torque fluctuations in the motor output so as to maintain it at substantially constant speed.

13. The combination of claim 12, and manual means for adjusting the control means to maintain any selected speed.

14. The combination of claim 13, and a relay switch for energizing said braking means in response to the supply of current to said motor, said relay switch being operated by the back E. M. F. of said motor upon interruption of the supply of current to said motor so as to return said control means to starting position before said motor comes to rest.

References Cited in the file of this patent

UNITED STATES PATENTS

| 711,663 | Herdman | Oct. 21, 1902 |
| 912,144 | Mavor | Feb. 9, 1909 |
| 1,828,943 | Rossman | Oct. 27, 1931 |
| 1,830,485 | Rossman | Nov. 3, 1931 |
| 2,170,836 | Smith | Aug. 29, 1939 |
| 2,590,682 | Cawley et al. | Mar. 25, 1952 |
| 2,632,140 | Pestarini | Mar. 17, 1953 |

FOREIGN PATENTS

| 748,664 | France | Apr. 25, 1933 |
| 654,663 | Germany | Dec. 29, 1937 |